(12) United States Patent
Dent

(10) Patent No.: US 7,038,733 B2
(45) Date of Patent: May 2, 2006

(54) TELEVISION RECEIVERS AND METHODS FOR PROCESSING SIGNAL SAMPLE STREAMS SYNCHRONOUSLY WITH LINE/FRAME PATTERNS

(75) Inventor: Paul Dent, Pittsboro, NC (US)

(73) Assignee: Ericsson Inc., Research Triangle Park, NC (US)

(*) Notice: Subject to any disclaimer, the term of this patent is extended or adjusted under 35 U.S.C. 154(b) by 547 days.

(21) Appl. No.: 10/060,803

(22) Filed: Jan. 30, 2002

(65) Prior Publication Data

US 2003/0142234 A1 Jul. 31, 2003

(51) Int. Cl.
*H04N 5/21* (2006.01)

(52) U.S. Cl. ...................................... 348/614
(58) Field of Classification Search ................ 348/607, 348/608, 614, 611, 725; 375/347; 455/205
See application file for complete search history.

(56) References Cited

U.S. PATENT DOCUMENTS

| | | | |
|---|---|---|---|
| 5,119,196 A | 6/1992 | Ayanoglu et al. | |
| 5,241,702 A | 8/1993 | Dent | |
| 5,253,063 A | 10/1993 | Ebihara et al. | |
| 5,331,416 A | 7/1994 | Patel et al. | |
| 5,335,010 A | 8/1994 | Lindemeier | |
| 5,461,646 A * | 10/1995 | Anvari | 375/347 |
| 5,479,453 A * | 12/1995 | Anvari et al. | 375/348 |
| 5,517,689 A * | 5/1996 | Hayashihara | 455/205 |
| 5,568,520 A | 10/1996 | Lindquist et al. | |
| 5,712,637 A | 1/1998 | Lindquist et al. | |
| 5,749,051 A | 5/1998 | Dent | |
| 5,799,038 A * | 8/1998 | Nowara et al. | 375/224 |
| 5,809,088 A * | 9/1998 | Han | 375/344 |
| 5,812,217 A | 9/1998 | Cahill, III | |
| 5,818,543 A * | 10/1998 | Lee | 348/725 |
| 5,894,334 A * | 4/1999 | Strolle et al. | 348/725 |
| 5,918,169 A * | 6/1999 | Dent | 455/324 |
| 5,930,231 A * | 7/1999 | Miller et al. | 370/210 |
| 6,023,306 A | 2/2000 | Limberg | |
| 6,043,783 A * | 3/2000 | Endo et al. | 343/713 |
| 6,151,367 A * | 11/2000 | Lim | 375/326 |
| 6,184,942 B1 | 2/2001 | Patel et al. | |
| 6,301,298 B1 | 10/2001 | Kuntz et al. | |
| 6,313,882 B1 * | 11/2001 | Limberg et al. | 348/614 |
| 6,313,885 B1 | 11/2001 | Patel et al. | |
| 6,449,071 B1 * | 9/2002 | Farhan et al. | 398/79 |
| 6,463,266 B1 * | 10/2002 | Shohara | 455/196.1 |
| 6,490,010 B1 * | 12/2002 | Shibuya et al. | 348/735 |
| 6,493,397 B1 * | 12/2002 | Takahashi et al. | 375/285 |
| 6,526,264 B1 * | 2/2003 | Sugar et al. | 455/84 |
| 6,618,096 B1 * | 9/2003 | Stapleton | 348/608 |

(Continued)

FOREIGN PATENT DOCUMENTS

WO   WO 99/23816   5/1999

(Continued)

*Primary Examiner*—Paulos M. Natnael
(74) *Attorney, Agent, or Firm*—Myers Bigel Sibley & Sajovec, P.A.

(57) ABSTRACT

Television receivers receieve a television signal and down-convert the television signal to generate a complex baseband signal. The complex baseband signal is differeniated and then integrated to reduce a direct current (DC) offset in the complex baseband signal. The television receiever may include a periodic known information field. The known information field is correlated with the integrated signal to determine a residual offset therein that is associated with a constant used in integrating the differentiated complex baseband signal. The residual offset is substracted from this constant when integrating the differeniated complex baseband signal.

35 Claims, 8 Drawing Sheets

U.S. PATENT DOCUMENTS 6,859,501 B1* 2/2005 Zimmermann et al. ..... 375/260
2001/0043650 A1* 11/2001 Sommer et al. ............ 375/232
2004/0140932 A1* 7/2004 Spilker, Jr. .................. 342/464

FOREIGN PATENT DOCUMENTS

WO      WO 00/70868     11/2000

* cited by examiner

TELEVISION RECEIVERS AND METHODS FOR PROCESSING SIGNAL SAMPLE STREAMS SYNCHRONOUSLY WITH LINE/FRAME PATTERNS

BACKGROUND OF THE INVENTION

The present invention relates generally to the field of television receivers, and, more particularly, television receivers and methods for reducing ghosting and for mitigating the deleterious effects on television signal reception due to multipath propagation.

In the United States (U.S.), there are numerous television stations that transmit video modulated signals from towers distributed about the country. In many locations, it may be difficult or impossible to use a fixed-pointing directional antenna, as the television transmission towers may lie in various directions. In general, there is no reason to expect better angular correlation of sites with the introduction of digital or HDTV standards.

Antenna rotators are often used to overcome this difficulty, but the rotators typically operate slower than the speed at which a viewer may wish to "channel-surf." The need to re-orient an antenna to receive different channels may be an inconvenience and may present other difficulties when an antenna is shared between many television sets in different rooms or dwellings, such as an apartment building where many different viewers will typically be tuned to many different television channels simultaneously.

In apartment buildings without communal antenna systems, a viewer may need to resort to an indoor antenna to receive broadcast television signals, which may then be subject to distortion due to reflection from nearby objects in the same room or even on the other side of radio-transparent walls. In locations obscured by surrounding high terrain, it may be difficult or impossible to receive a direct television signal wave with any reasonable external antenna mast height, although television signals may be received by diffraction over a hill or by reflection. These diffracted and/or reflected signals may be impaired due to multipath propagation, which may result in attenuation of some frequency components of the video signal and/or ghosting if the multipath delays are a non-negligible fraction of the line scan period. Often, the preference for a high-gain, outdoor, directional antenna stems not from the need for greater signal strength, but from the need to exclude signal reflections by angle-of-arrival discrimination to reduce ghosting.

U.S. Pat. No. 5,119,196 to Ayanoglu et al. (hereinafter '196 patent), the disclosure of which is hereby incorporated herein by reference, describes finite impulse response (FIR) and infinite impulse response (IIR) equalization techniques for television picture ghost cancellation. The '196 patent describes limitations of an IIR channel inverse equalizer when the poles of the channel-descriptive z-polynomial approach the unit circle. The '196 patent also describes factorizing the channel-descriptive polynomial into a causal factor having poles inside the unit circle and an anti-causal factor having poles outside the unit circle, and processing a scan line of signal samples in time-reversed order to implement the anti-causal part. The '196 patent explains that the limitations of these conventional equalizers may be partially eliminated by assuming that the line sync pulse is a zero video signal for a period at each end of the scan line that can be regarded as a guard time between lines. Thus, for ghost delay spread shorter than this guard time, signal equalization may be performed on a line-by-line basis with no carryover from or to adjacent lines. This technique equalizes the video information in the line, but may not remove interference from the sync pulse. Unfortunately, according to the U.S. NTSC standard, the sync pulse is only a zero signal only for a period after detection and if the sync pulse is clamped by a DC restoration circuit such that its peak value is zero. It may be desirable to equalize a television signal predetection at which time the sync pulse is not a zero signal, but instead is a period of maximum transmission.

The techniques described in the '196 patent may also be limited in the delay that they can equalize. The '196 patent describes a processing-intensive technique for adapting equalizer weights for a least-squares reproduction of a test signal. The '196 patent suggests complementing the ghost reduction equalizers with an adaptive antenna, but does not provide implementation details for the adaptive antenna or suggest that the adaptive antenna may be a diversity antenna having two separate output signals. The '196 patent appears to suggest processing the television video signal after detection, which may not allow exploitation of the relative phase difference between delayed signal paths. Finally, the equalization system described in the '196 patent is designed to cancel echos by subtracting them away from the desired signal. Unfortunately, this approach may risk degradation of the desired signal in the echo cancellation process.

Other patents that discuss ghost removal include: U.S. Pat. No. 5,253,063 to Ebihara et al. (hereinafter '063 patent), U.S. Pat. No. 5,812,217 to Cahill, III (hereinafter '217 patent), and U.S. Pat. No. 5,331,416 to Patel et al. (hereinafter '416 patent). Patents that discuss antenna selection diversity include: U.S. Pat. No. 5,335,010 to Lendemeier et al. (hereinafter '010 patent) and U.S. Pat. No. 5,818,543 to Lee (hereinafter '543 patent). The '063 patent, '217 patent, '416 patent, '010 patent, and '543 patent are hereby incorporated herein by reference.

Unfortunately, antenna selection diversity may be hard to reconcile with ghost equalization due to the changing ghost characteristics caused by antenna switching. Accordingly, there is a need for improved television receivers, which may reconcile diversity reception with ghost removal in an economically efficient manner.

SUMMARY OF THE INVENTION

Embodiments of the present invention provide television receivers and methods of operating same in which a television signal is received and downconverted to generate a complex baseband signal. The complex baseband signal is differentiated and then re-integrated to reduce a direct current (DC) offset in the complex baseband signal. The television receiver may comprise a periodic known information field. The known information field is correlated with the integrated signal to determine a residual offset therein that is associated with a arbitrary constant arising from re-integrating the differentiated complex baseband signal. The residual offset is subtracted from re-integrated, differentiated complex baseband signal constant when integrating the differentiated complex baseband signal.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF PREFERRED EMBODIMENTS

Figure 1:
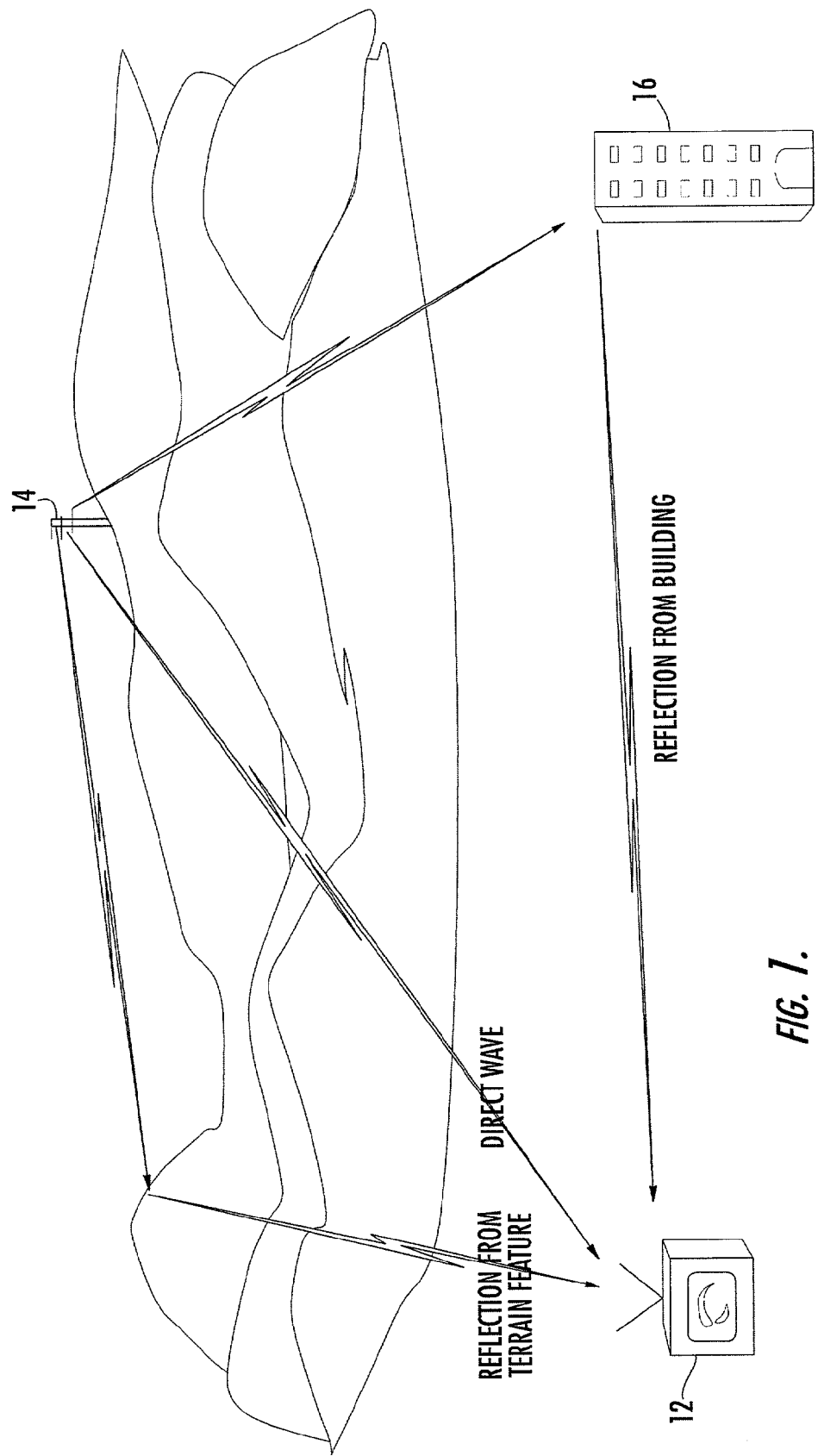
FIG. 1 illustrates an example of multipath television reception.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures. It will also be understood that when an element is referred to as being "connected" or "coupled" to another element, it can be directly connected or coupled to the other element or intervening elements may also be present. In contrast, when an element is referred to as being "directly connected" or "directly coupled" to another element, there are no intervening elements present.

Referring now to FIG. 1, an example of multipath television reception is illustrated. Typically, UHF signals are used in cellular wireless telephone systems or television broadcast systems. By its nature, a broadcast system illuminates a wide area from an antenna site, and reflections from objects such as buildings or terrain features may be received at the television receiver as well as the direct wave. As shown in FIG. 1, a television 12 receives a direct wave signal from a transmitter 14 along with a second signal that is reflected from a terrain feature and a third signal that is reflected from a building 16. The superposition of delayed waves may cause distortion to the information modulation. In digital cellular systems, various equalizer methods have been developed to reduce degradation of digital data error rates due to multipath distortion. In television broadcast systems, multipath propagation has long been recognized as the cause of picture degradation known as ghosting. One approach to reducing ghosting is to use a directional antenna for television signal reception and to orient the antenna to receive the strongest wave and to exclude other waves arriving from different directions. This approach, however, discards energy arriving at the television receiver that could, in principle, be used to improve reception if it could be properly integrated.

Figure 2:
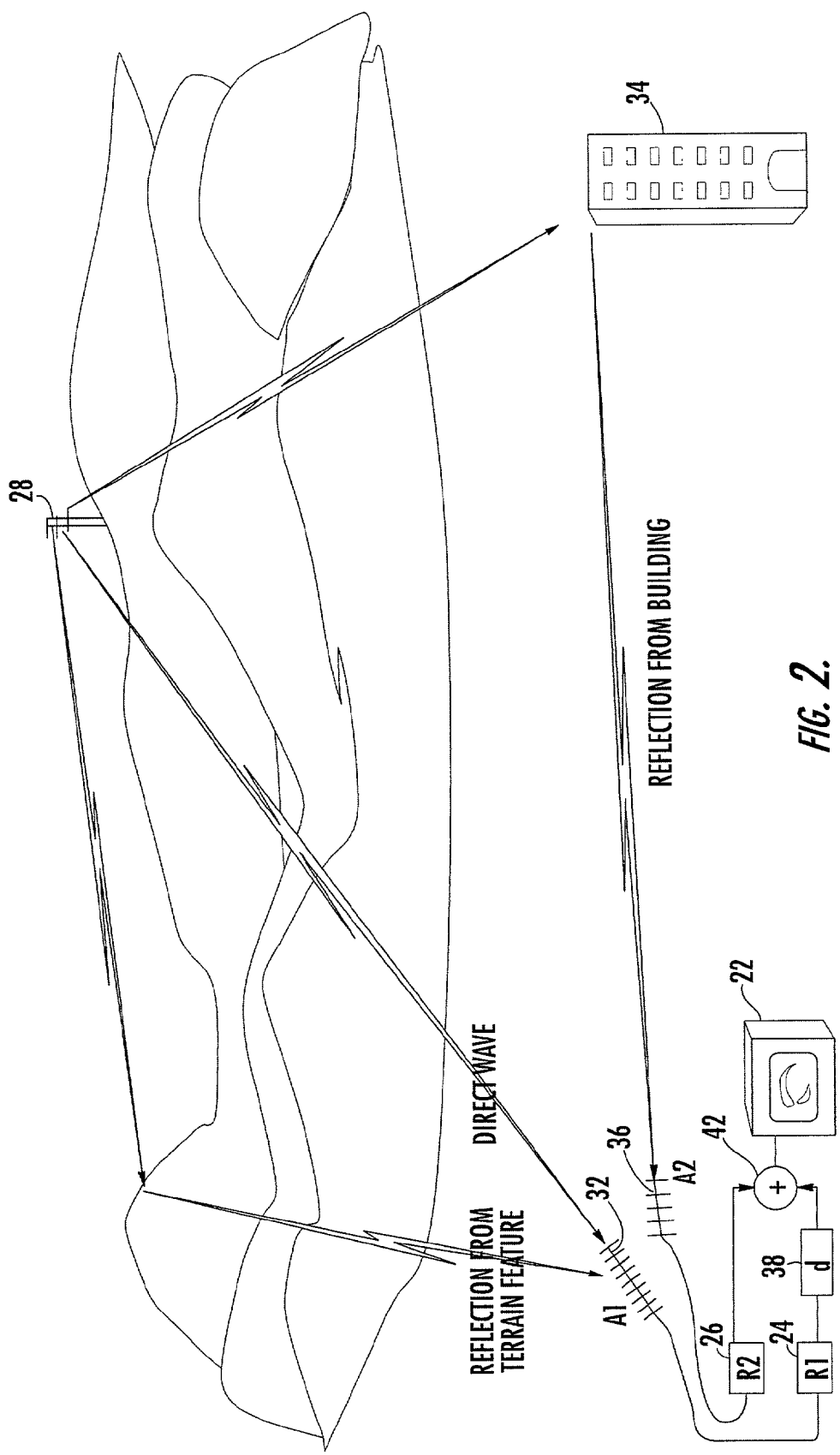
FIG. 2 illustrates an example of diversity television reception for processing multipath signals.

FIG. 2 illustrates an example of diversity television reception for processing multipath signals. A television 22 comprises a first receiver 24 and a second receiver 26. The first receiver 24 receives a direct wave signal and a reflected signal from a terrain feature, which are transmitted by a transmitter 28, through a first antenna 32. The second receiver 26 receives a signal from the transmitter 28, which has been reflected from a building 34, through a second antenna 36. The signals received through the first receiver 24 are delayed by a delay circuit 38, and then the signals received through both the first and second receivers 24 and 26 are combined by the adder circuit 42.

Television receivers, in accordance with embodiments of the present invention, are based on a homodyne or direct conversion receiver architecture. Improvements to these architectures are described in the following patents, which are hereby incorporated herein by reference: U.S. Pat. No. 5,241,702 to Dent (hereinafter '702 patent), U.S. Pat. No. 5,568,520 to Lindquist et al. (hereinafter '520 patent), U.S. Pat. No. 5,712,637 to Lindquist et al. (hereinafter '637 patent), U.S. Pat. No. 5,749,051 to Dent (hereinafter '051 patent), and U.S. Pat. No. 5,918,169 to Dent (hereinafter '169 patent).

The '702 patent describes a solution for a direct current (DC) offset problem, which may occur in homodyne or direct conversion receivers. The homodyne DC offset problem refers to the direct conversion of small received signals in the microvolt to millivolt range to complex baseband signals centered around zero frequency (DC) but at a DC offset on the order of several millivolts to hundreds of millivolts. Unfortunately, the large magnitude of the DC offset may drown out the desired signal. For example, if the output signals of the homodyne downconvertor are to be digitized using an analog-to-digital (A/D) convertor, then the A/D full-scale setting preferably encompasses the DC offset to avoid clipping. In this case, however, the desired signal may only occupy a few least significant bits. If sufficiently high dynamic range A/D convertors can be used so that the number of least significant bits occupied by the desired signal is still adequate, then the DC offset may be preserved through digital domain processing where it may be distinguished from the desired signal components.

Another approach for removing homodyne DC offset involves differentiating the homodyne downconvertor output signals to remove DC offset, performing A/D conversion of the differentiated signals to obtained digitized samples of the differentiated signals, and then integrating the digitized samples using digital accumulation to undo the differentiation and restore the signal waveform. The restored signal waveforms after digital accumulation have a DC offset that is equal to an arbitrary constant of reintegration, which is related to the value of the received signal at the time the accumulator was last zero or set to zero. This DC offset error is only as large as the signal value at the last accumulator reset, and, thus, does not add significantly to the A/D convertor dynamic range requirements. This residual error may be estimated and subtracted out by using some feature of the desired signal that allows it to be distinguished from the error.

Various examples of reception of digitally modulated data signals and analog frequency modulated (FM) signals are described in the '702 patent. In the case of digital signals, a known symbol pattern or syncword may be included in transmissions and compared to the received waveform after digital accumulation to determine multipath channel propagation coefficients as well as DC offset. In the case of an analog FM signal, the complex signal values generated in a homodyne receiver should lie on a circle of constant amplitude and should vary only in phase angle. By identifying a locus of successive values, the displacement of the center of the locus circle from the origin may be identified, which corresponds to the DC offset in the real and imaginary (I, Q) channels.

Figure 3:
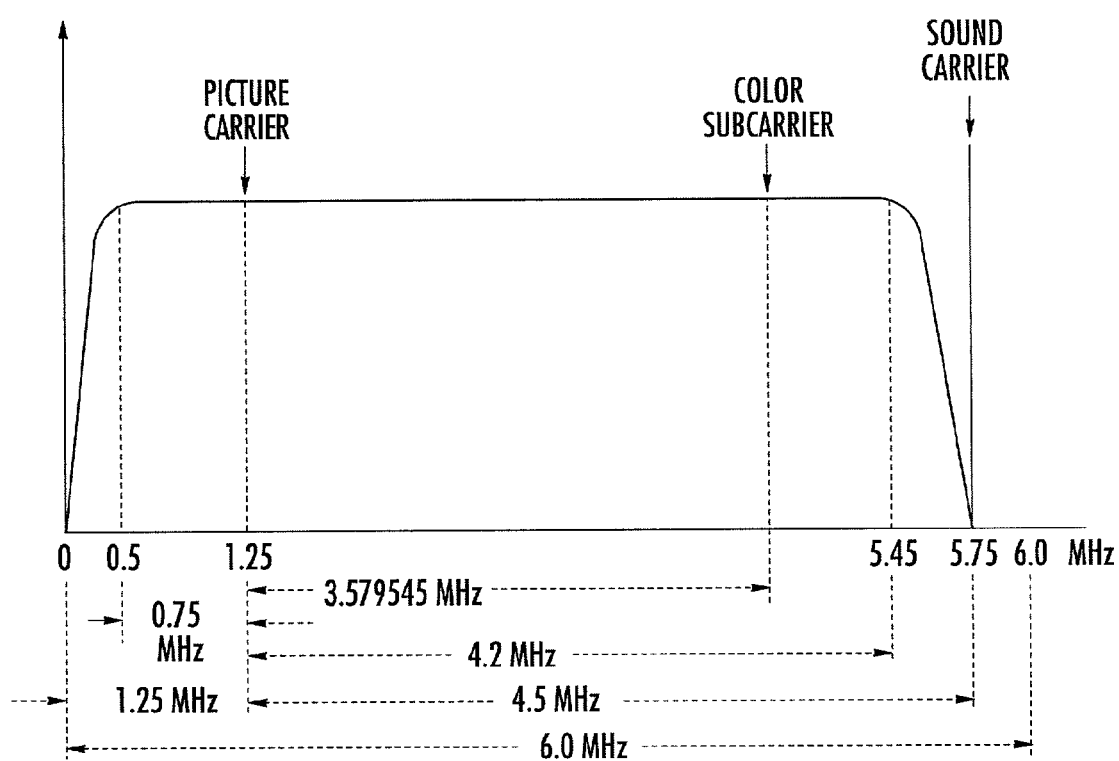
FIG. 3 illustrates the frequency spectrum of an NTSC television signal.

For purposes of illustration, embodiments of the present invention are described herein in the context of receiving a U.S. NTSC signal, which uses vestigial sideband amplitude modulation. The frequency spectrum of an NTSC signal is illustrated in FIG. 3. It will be understood, however, that embodiments of the present invention may also be used to receive analog television signals based on other standards, such as the European PAL standard and/or the French SECAM standard. These standards are similar to the U. S. NTSC standard, with adjustments to the bandwidth, sound, and color subcarrier positions. It will be further understood that embodiments of the present invention may also be used to receive digital television signals. One digital television standard uses 8-level amplitude modulation. Accordingly, television receivers, in accordance with embodiments of the present invention, may be used to provide economic, multi-standard television reception.

Figure 4:
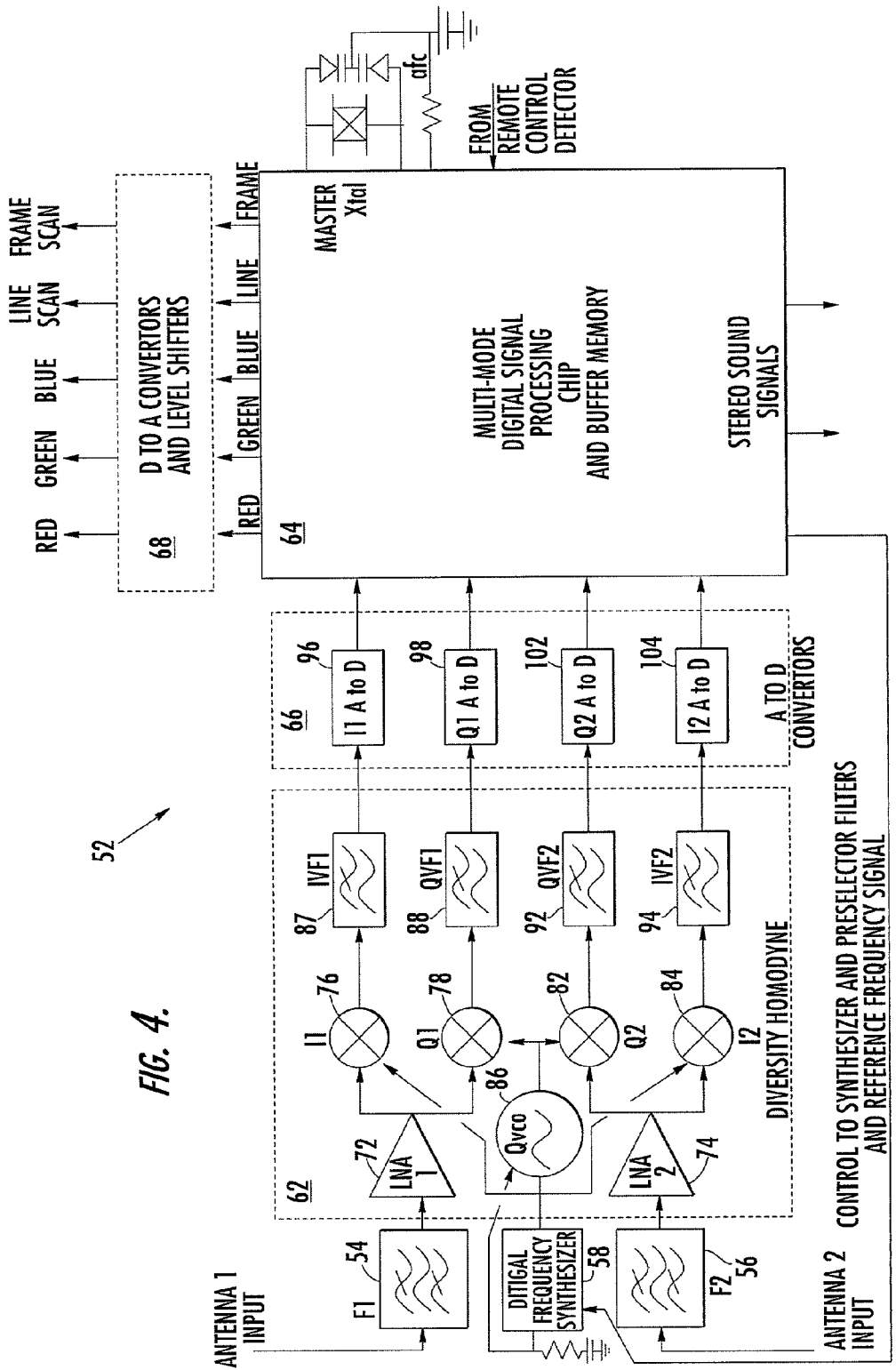
FIG. 4 is a block diagram that illustrates a homodyne television receiver in accordance with embodiments of the present invention.

Referring now to FIG. 4, a homodyne receiver 52, in accordance with embodiments of the present invention, comprises a first antenna input and a second antenna input, which are coupled to a first input filter 54 and a second input filter 56, respectively. The receiver 52 further comprises a digital frequency synthesizer 58 that, along with the first and second input filters 54 and 56, is coupled to a quadrature downconvertor circuit 62. The quadrature downconvertor circuit 62 is coupled to a multi-mode digital signal processing (DSP) circuit 64 by a bank of A/D convertors 66. A bank of digital-to-analog (D/A) convertors 68 is coupled to the multi-mode DSP circuit 64.

The downconvertor circuit 62 comprises a pair of low noise amplifiers (LNAs) 72 and 74 that are coupled to the first and second input filters 54 and 56, respectively. The output of the first LNA 72 is coupled to the inputs of two mixer circuits 76 and 78. The output of the second LNA 74 is coupled to the inputs of two mixer circuits 82 and 84. The downconvertor circuit 62 further comprises a quadrature voltage controlled oscillator (QVCO) 86 (i.e., local oscillator), which generates a first output signal corresponding to a sine wave centered on a desired frequency, such as a video carrier frequency, and a second output signal corresponding to a cosine wave centered on the desired frequency. The sine wave signal output from the QVCO 86 is provided to mixer circuits 78 and 82 while the cosine wave signal output from the QVCO 86 is provided to mixer circuits 76 and 84. In this manner, an I signal or in-phase signal is generated at the output of each of the mixer circuits 76 and 84 while a Q-signal or quadrature signal is generated at the output of each of the mixer circuits 78 and 82.

The output signals from the mixer circuits 76, 78, 82, and 84 contain frequency components corresponding to both the sum of the frequencies of the input signals thereto and the difference of the frequencies of the input signals thereto. Accordingly, low pass filters 87, 88, 92, and 94 are coupled to the mixer circuits 76, 78, 82, and 84, respectively, to suppress those frequency components corresponding to the sum of the frequencies and to pass those frequency components corresponding to the difference of the frequencies. Each I, Q signal pair output from the low pass filters 87, 88, 92, and 94 may be referred to as a complex baseband signal.

The A/D convertor bank 66 comprises four A/D convertors 96, 98, 102, and 104, which generate digital samples from the output signals from the low pass filters 87, 88, 92, and 94, respectively. These output samples are then processed by the multi-mode DSP circuit 64 to generate, for example, stereo sound signals, color signals, a line scan signal and a frame scan signal. The multi-mode DSP circuit 64 may also be used to control the digital frequency synthesizer 58.

As discussed above, the digital frequency synthesizer 58 may be used to control the QVCO 86 such that the output signals from the QVCO 86 are centered on the video carrier frequency used in conventional analog television operation and the first and second input filters 54 and 56 may be configured to suppress interference on the sideband frequencies. In other embodiments of the present invention, the digital frequency synthesizer 58 may control the QVCO 86 such that the output signals from the QVCO 86 are centered in the middle of a television channel and the low-pass filters 86, 88, 92, and 94 may be used to effect symmetrical selectivity about the center of the channel. In the latter case, each of the I and Q signals may be about 2.5–5 MHz wide, while in the former case, the I, Q signals may be about 6 MHz wide. Accordingly, these signals are sampled at the Nyquist rates of 6 MHz and 12 MHz, respectively, or higher. A convenient rate that is greater than the minimum Nyquist rate and that may simplify later extraction of the color subcarrier information is an I, Q signal sample rate of 2 or 4 times the color subcarrier rate, using a 2× or 4× color subcarrier frequency crystal clock, which may be derived from the master crystal coupled to the multi-mode DSP circuit 64. The color subcarrier frequency in the NTSC standard is 3.579545 MHz, which results in sampling rates of 7.15909 MHz or 14.31818 MHz. If the homodyne receiver is centered on the video carrier, then cross-coupled I, Q baseband filters may be used to implement asymmetrical selectivity for suppressing lower adjacent channel signals.

Figure 5:
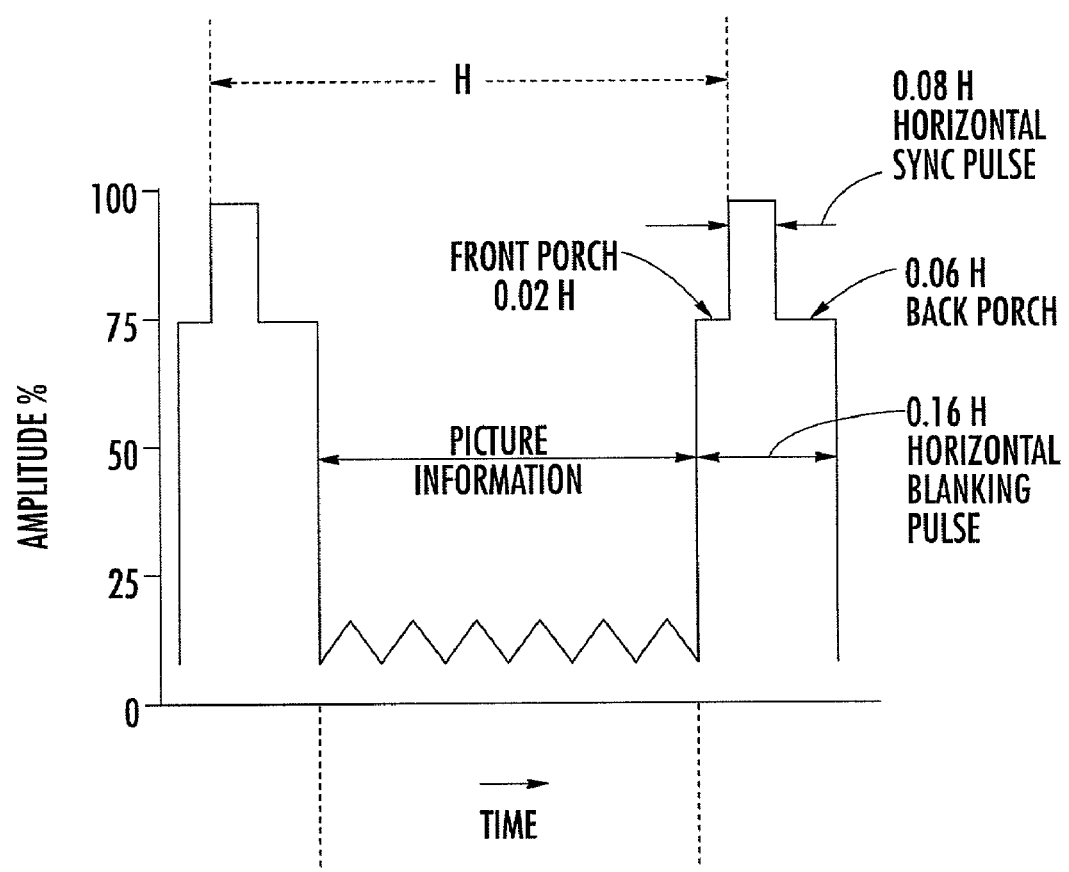
FIG. 5 illustrates a sync pulse of an NTSC television signal.

FIG. 5 illustrates a sync pulse used in an NTSC television signal. The sync pulse comprises a horizontal blanking pulse, which includes a front porch period, a horizontal sync pulse period, and a back porch period as shown. When a receiver is centered on the video carrier frequency and frequency errors between the local oscillator and the video carrier frequency are removed by automatic frequency control (AFC) or phase locking, then a DC offset may appear on the video output signal to shift the video signal levels including the sync pulse levels. If the sync pulse has a peak level denoted by 100%, then the levels during the front porch and back porch periods are at 75%. An additive DC offset Io raises the sync pulse peak level to 1+Io and the front porch and back porch levels to 0.75+Io. The DC offset Io may, therefore, be deduced from the average value of four times the front/back porch level value minus three times the sync pulse peak level value. The identified level of Io may then be subtracted from the homodyne receiver output signal to reduce DC offset. An automatic gain control (AGC) circuit may also be used to average the corrected peak value of the sync pulse and to adjust the receiver gain until it equals the expected or desired 100% video waveform level.

Thus, according to embodiments of the present invention, processing I, Q signals synchronously with the NTSC sync pulse may allow estimation and subtraction of homodyne DC offset as will be described in more detail below. This methodology for reducing DC offset may be used independent of the centering frequency used by the local oscillator. (e.g., QVCO 86 of FIG. 4). It will be further understood that the principles and concepts of the present invention may also be applied to digital television signals, which may be susceptible to multipath propagation distortion, i.e., the same phenomenon that causes ghosting in analog television reception.

If the local oscillator is not centered on the video carrier, then frequency error exists between the local oscillator and the video carrier. To reduce this frequency error, the I, Q signals output from the homodyne downconvertor circuit (e.g., downconvertor circuit 62 of FIG. 4), may be rotated systematically to remove the frequency error either before or after being converted to digital samples. The frequency error may be detected by detecting phase rotation in successive (I, Q) values sampled at the sync pulse peaks. The error may be reduced by bringing the phase of the sync pulse peaks to the zero degree point on average. The homodyne DC offset may then, however, be shifted to the difference frequency, which may cause the sync pulse levels to drift up and down in a repetitive sine wave fashion.

To reduce DC offset, the I, Q complex baseband signals output from a downconvertor circuit may first be differentiated. Next, the differentiated signals may be processed by an A/D convertor bank to obtain a sequence of digital samples. After processing the differentiated and digitized signals to correct frequency error and mitigate ghosting, the resultant signal is a differentiated composite video signal from which the sound signal may be removed by a digital notch filter tune to reject the sound subcarrier frequency. The resultant signal minus the sound signal may then be recombined with precomputed differentiated sync pulse patterns to determine updated timing and frequency errors, and then integrated using digital value accumulation to restore the undifferentiated video signal.

The undifferentiated video signal now contains a DC offset, however, in the form of an arbitrary constant of integration. This constant of integration is bounded, however, to a value on the order of the amplitude of the undifferentiated video signal. This residual DC offset may be determined by averaging restored video signal samples taken during the 8% of the line scan period H (see FIG. 5) that the sync pulse is at a peak value to determine a mean value L1 of the sync pulse amplitude, and also by averaging restored video signal samples taken during the 2% of the line scan period H corresponding to the front porch period to obtain a mean value L2. The sync pulse should be at 75% of its peak value during the front porch period. Accordingly, the DC offset to be removed may be given by Equation 1 below:

$$DC\ \text{offset}=4*L2-3*L1 \qquad \text{EQ.1}$$

The DC offset value computed in Equation 1 may optionally be averaged over many line scans or frames and then subtracted from the restored, undifferentiated video signal. After the residual DC offset is removed, the mean level of the sync pulse amplitude may be used to adjust a gain control setting for the receiver chain until the peak amplitude of the sync pulse is equal to 100% of the desired video signal amplitude.

After the video signal has been processed to reduce DC offset and gain adjusted, the video signal may be further processed by, for example, a multi-mode DSP circuit (e.g., the multi-mode DSP circuit 64 of FIG. 4) to extract color information. The color information (chrominance) may be combined with the video signal (luminance) to produce red, green, and blue (RGB) drive signals for a display. These digital RGB signals may be processed by a D/A convertor bank (e.g., the D/A convertor bank 68 of FIG. 4) and optionally level shifted to drive the electron guns of a cathode ray tube (CRT) or the analogous RGB intensity controls of other color displays, such as liquid crystal displays (LCDs). The digital processing may further include the removal of mono and/or stereo sound signals through the use of a notch filter. The digital sounds signals may also be converted into analog form using one or more D/A convertors whose output signals may be amplified and used to drive loudspeakers.

In some embodiments of the present invention, television receivers may have a local oscillator (e.g., QVCO 86 of FIG. 4) that is centered at half the color subcarrier frequency above the video carrier. Low pass filters used to filter the I, Q signals (e.g., low pass filters 87, 88, 92, and 94 of FIG. 4) may then be symmetrical and have notches located at the channel spacing +/− (color subcarrier frequency)/2, which may improve the suppression of the upper and lower adjacent channel video carriers and their respective chrominance signals. These symmetrical filters may be advantageous due to their simplicity. As discussed above, the DC offset is shifted to the difference between the center frequency used by the local oscillator and the video carrier. Accordingly, the DC offset is shifted to 1.7897725 MHz, which is half the color subcarrier frequency. In addition, the I, Q signals may be progressively phase-rotated to remove the half-color subcarrier offset. The video output samples may then be generated by combining the I and Q samples to obtain a real video signal sampled at double the color subcarrier frequency.

Methods for reducing the residual DC offset due to the constant of integration when the local oscillator of a television receiver is centered at half the color subcarrier frequency above the video carrier, in accordance with embodiments of the present invention, will now be described.

When the I, Q signals are progressively phase rotated to remove the half-color subcarrier offset, the residual DC offset due to the constant of reintegration may appear as an unwanted 1.7897725 MHz signal. This may be difficult to distinguish from video signal components around this frequency. Because video signal components are not transmitted during the sync pulse interval, unwanted signals occurring during the sync pulse period may be determined and averaged over multiple pulses to determine an estimate related to the residual DC offset. The estimated DC offset may then be subtracted from the I, Q signals before progressive phase rotation to reduce the 1.7897725 MHz signal component, which is present in the sync pulses.

Figure 6:
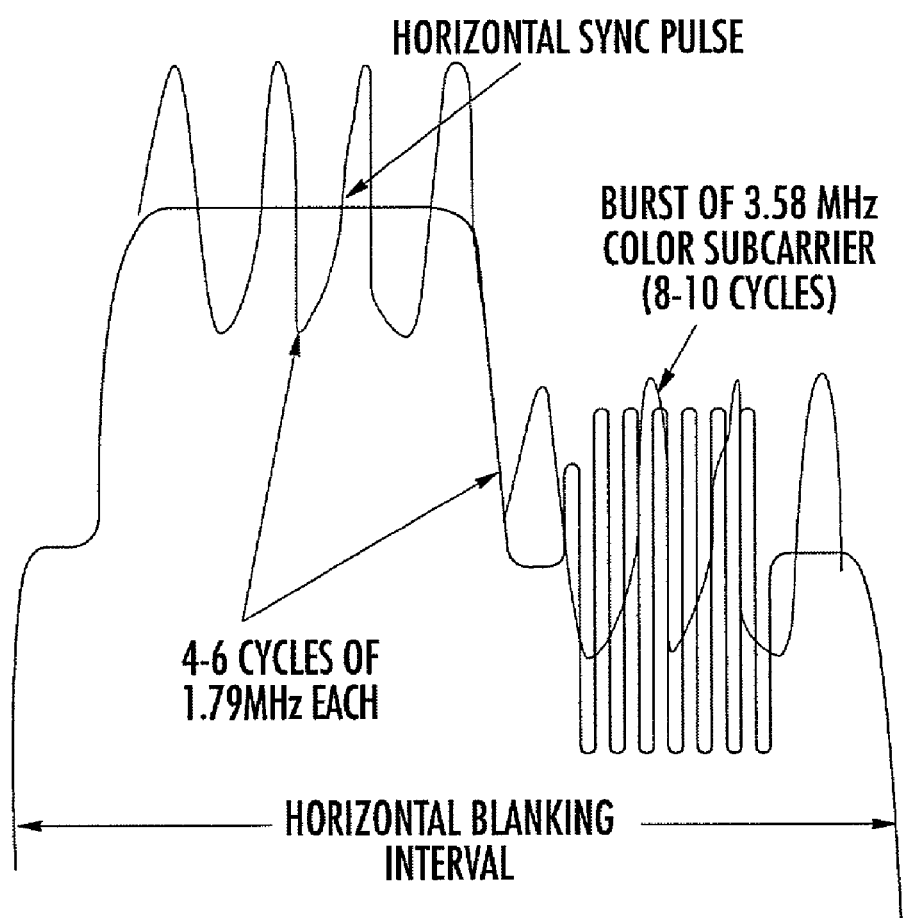
FIG. 6 illustrates the presence of a half-color subcarrier signal in the sync pulse.

FIG. 6 illustrates the presence of the half-color subcarrier signal in the sync pulse. This unwanted signal component may be detected by subtracting digital samples one color subcarrier cycle apart, which is half a cycle at the half-color subcarrier frequency. The color subcarrier burst at 3.58 MHz has equal values one cycle apart, which cancel upon subtraction.

If I, Q samples at twice the color subcarrier frequency are denoted by $Z(i)=\{I(i), Q(i)\}$, then the following complex numbers may be computed:

$$C=(Z(i)-Z(i+2)+Z(i+4)-Z(i+6)+Z(i+8)-Z(i+10)+Z(i+12)-Z(i+14))/8;$$

$$S=(Z(i+1)-Z(i+3)+Z(i+5)-Z(i+7)+Z(i+9)-Z(i+11)+Z(i+13)-Z(i+15))/8;\ \text{and}$$

$$P=(Z(i)+Z(i+1)+Z(i+2),\ldots Z(i+15)/16.$$

where i is the first sample after the beginning flank of the front porch of the sync pulse (see FIG. 5). The complex numbers C and S may also be computed as above using samples taken on the back porch of the sync pulse and averaged with the front porch computations to obtain even better estimates.

The phase angle of P corresponds to the phase error, i.e., difference from the real (I) axis of the phase rotated video signal, and the magnitude of P is the 100% video signal amplitude, which may be used for AGC. The residual DC offset due to the constant of integration in the I signal is given by the real part of $C*P'/|P|$, where $P'$ is the conjugate of P, and the residual DC offset due to the constant of integration in the Q signal is given by the real part of $S*P'/|P|$. These residual DC offset estimates may be scaled and provided to an averaging accumulator forming a feedback loop integrator where they are subtracted from the I and Q signals before phase rotation to reduce the residual DC offset.

Figure 7:
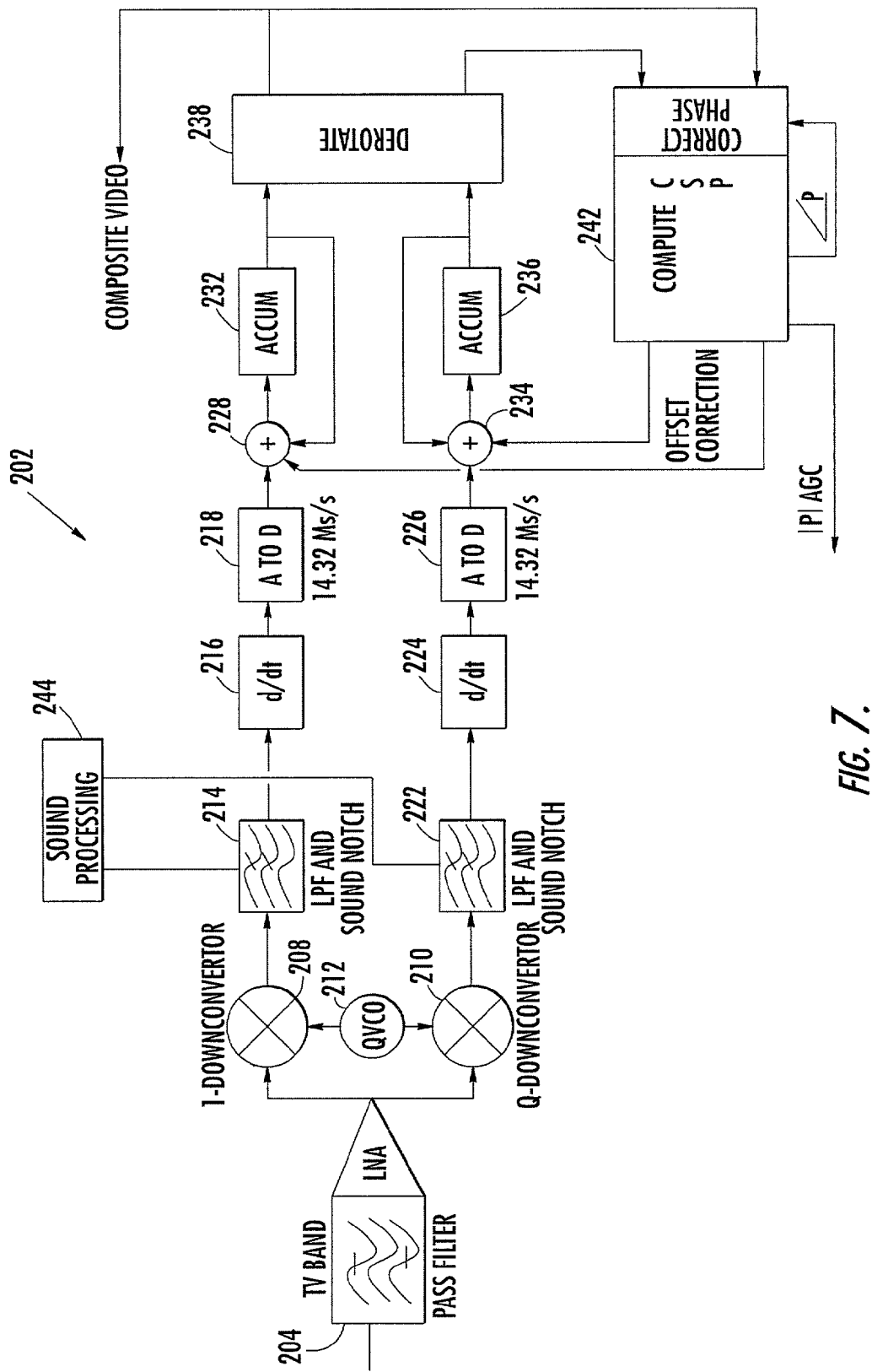
FIG. 7 is a block diagram that illustrates a homodyne television receiver in accordance with further embodiments of the present invention.

Referring now to FIG. 7, a homodyne receiver 202 is illustrated that is configured for use in a television receiver that is centered at half the color subcarrier frequency above the video carrier in accordance with embodiments of the present invention. The homodyne receiver 202 comprises a television bandpass filter 204, which may be coupled to an antenna for receiving a television signal. The output of the bandpass filter 204 is coupled to a LNA 206. The output of the LNA 206 is coupled to the inputs of two mixer circuits 208 and 210. A QVCO 212 generates an output signal at half the color subcarrier frequency above the video carrier. The output signal from the QVCO 212 is provided as an input signal to both of the mixer circuits 208 and 210. The output of the mixer circuit 208 is coupled to a low pass filter 214, a differentiator circuit 216, and an A/D convertor 218 connected in series as shown in FIG. 7. Similarly, the output of the mixer circuit 210 is coupled to a low pass filter 222, a differentiator circuit 224, and an A/D convertor 226. The output of the A/D convertor 218 is coupled to an adder circuit 228 and an accumulator circuit 232, which are connected in series. Similarly, the output of the A/D convertor 226 is coupled to an adder circuit 234 and an accumulator circuit 236, which are connected in series. The outputs of the accumulator circuits 232 and 236 are coupled to a rotation circuit 238. A feedback loop is formed by a DSP circuit 242, which couples the outputs from the rotation circuit 238 to the inputs of the adder circuits 228 and 234. Exemplary operations of the homodyne receiver 202, in accordance with embodiments of the present invention, will now be described.

The bandpass filter 204 is configured to receive incoming television signals and to reject other signals outside of this frequency band. The incoming television signal is amplified by the LNA 206 and provided to the mixer circuits 208 and 210. The mixer circuit 208 multiplies the received television signal by the cosine wave signal output from the QVCO 212 to generate the I signal component. Similarly, the mixer circuit 210 multiplies the received television signal by the sine wave signal output from the QVCO 212 to generate the Q signal component. The I and Q signal components are filtered by the low pass filters 214 and 222, respectively, to remove those components corresponding to the sum of the incoming video signal frequency and the half color subcarrier frequency above the video carrier. The low pass filters 214 and 222 may also include a notch filter for separating the audio signal from the incoming television signal for processing by a sound processing circuit 244.

The homodyne DC offset may be reduced by differentiating the I and Q signals using the differentiator circuits 216 and 224, converting the differentiated signals to digital samples using the A/D convertors 218 and 226, and then integrating the digital samples by digital accumulation using the adder circuits 228 and 234 and the accumulator circuits 232 and 236.

The large homodyne offset may, thus, be replaced with an arbitrary constant of integration. This constant may be determined using classic differential equation principles by applying boundary constraints. The boundary constraints are that the recovered line or frame sync pulses conform to a waveform known a-priori. In particular, the half color subcarrier components occurring during the sync pulses should be absent. Detection of non-zero half color subcarrier components, as described above with reference to FIG. 6, allow the complex amounts $C*P'/|P|$ and $S*P'/|P|$ to be determined and fed back to the adder circuits 228 and 234 to correct the offset. Feeding back determined values to the adder circuits 228 and 234 prior to processing by the accumulator circuits 232 and 236 effectively places the integration function in the offset correction loop so that a first-order servo system for annulling the offset is created. Such first order systems settle to a steady state having zero error if the parameter being controlled is static. Thus, the residual homodyne offset due to the constant of reintegration may be controlled to zero by the homodyne receiver of FIG. 7 in accordance with embodiments of the present invention.

After the accumulators have reintegrated the signal, the half color subcarrier frequency offset is removed by the rotation circuit 238. The rotation circuit 238 provides a derotation function by performing complex multiplication to rotate the phase of the I and Q values successively by the cyclic sequence 0, −45, −90, −135, −180, −225, −270, −315, . . . degrees. After derotation, the sync pulse waveforms are restored except that they may appear in the I stream, the Q stream, or at a phase in between the real and imaginary axes. The DSP circuit 242 provides a phase correction function to correct this phase error and drift in the output signal from the rotation circuit 238 so that the sync pulse and the video signal appear in the I waveform. The phase correction function of the DSP circuit 242 is effectively a phase locked loop. The estimated frequency error component can be used to control the local oscillator QVCO 212 as AFC. In other embodiments, the QVCO 212 may be controlled by a digital frequency synthesizer using an accurate crystal reference. The amplitude of the sync pulse may be used for AGC, which adjusts analog gain or digital scaling such that the sync pulse amplitude reaches a desired level that is representative of the 100% video level. The DSP circuit 242 may also determine the time of occurrence of the sync pulses using known sync-separation techniques that may involve using a line-scan-rate phase locked loop to lock on to the periodicity of the sync pulse peaks. This phase locked loop may operate on the value of |P| so that it is operable before the angle of P is corrected by the phase correction loop of the DSP 242. Once the composite video signal is obtained, it may be processed digitally to implement numerically the color subcarrier demodulation and color demultiplexing to RGB signals normally performed by analog circuitry.

In the NTSC standard, the frame frequency is just less than the 60 Hz line frequency and one complete video field is interlaced over two frames, which makes the field frequency 29.97 Hz. The number of lines per field is 525, which makes the line scan frequency 525*29.97 or 15734.2637 Hz. The color subcarrier is deliberately set midway between two integer multiples of the line scan frequency and is 227.5 times the line scan frequency, i.e., 3579545 Hz. The purpose of this is so that interference from the color signal to the luminance signal is offset by half a cycle between adjacent lines, reducing its visual impact. In the above description of homodyne receiver embodiments with reference to FIG. 7, the I and Q signals may be sampled at 4 times the color subcarrier frequency, such that sampling is coherent with the color subcarrier. The position of the samples with respect to a fixed feature, such as the sync pulse, shifts by half a color subcarrier cycle between adjacent lines, which is nevertheless an integer number of 227.5*4=910 samples per line. Similar relationships exist with other television standards, such as PAL and SECAM.

Figure 8:
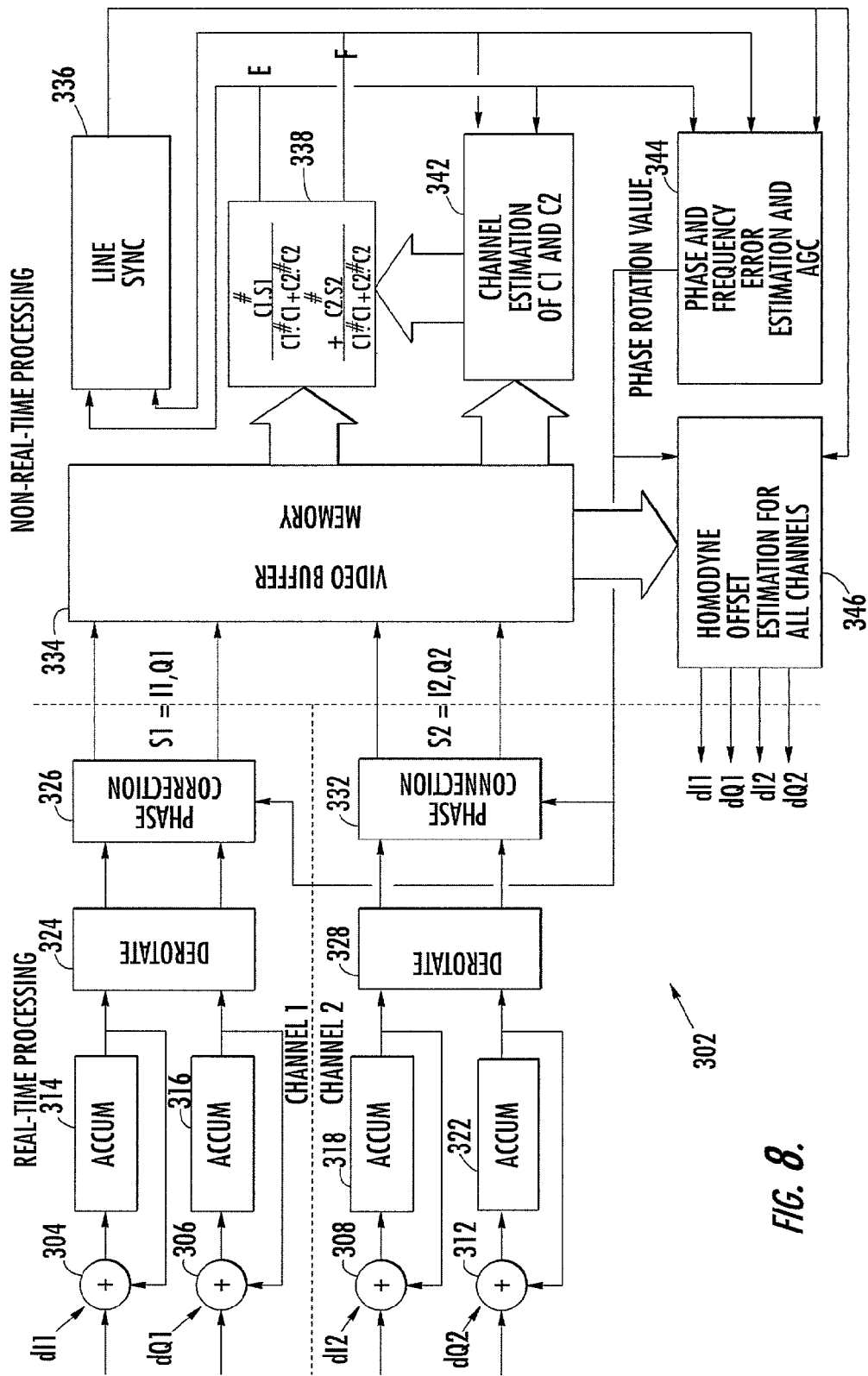
FIG. 8 is a block diagram that illustrates a diversity homodyne television receiver in accordance with embodiments of the present invention.

Referring now to FIG. 8, a multi-channel, diversity homodyne receiver 302 is illustrated that is configured for use in a television receiver that is centered at half the color subcarrier frequency above the video carrier in accordance with embodiments of the present invention. Although only two channels are illustrated in FIG. 8, it will be understood that the principles and concepts may be applied to additional channels in accordance with embodiments of the present invention. Signals on each channel are processed by homodyne downconvertor circuitry, differentiated, and converted to digital samples as discussed above with reference to FIG. 7. The diversity homodyne receiver 302 may be viewed as having a real-time processing portion and a non-real-time processing portion. The real-time processing portion comprises an adder circuit 304, which receives digital I signal samples associated with a first channel, an adder circuit 306, which receives digital Q signal samples associated with the first channel, an adder circuit 308, which receives digital I signal samples associated with a second channel, and an adder circuit 312, which receives digital Q signal samples associated with the second channel. A pair of accumulator circuits 314 and 316 is coupled to the outputs of the adder circuits 304 and 306, respectively. Similarly, a pair of accumulator circuits 318 and 322 is coupled to the outputs of the adder circuits 308 and 312, respectively. A first rotation circuit 324 couples the outputs of the accumulator circuits 314 and 316 to a first phase correction circuit 326. A second rotation circuit 328 couples the outputs of the accumulator circuits 318 and 322 to a second phase correction circuit 332.

The outputs from the phase correction circuits 326 and 328 are coupled to a memory buffer 334, which comprises part of the non-real-time processing portion of the diversity homodyne receiver 302. The non-real-time processing portion of the diversity homodyne receiver 302 further comprises a line synchronization circuit 336, a complex digital filter circuit 338, a channel estimation circuit 342, a phase and frequency error circuit 344, and a homodyne offset estimator circuit 346, which are configured as shown in FIG. 8. Exemplary operations of the diversity homodyne receiver 302, in accordance with embodiments of the present invention, will now be described.

Operations of the real-time processing portion of the diversity homodyne receiver 302 are similar to that described above with reference to FIG. 7 for the homodyne receiver 202. The phase corrected output signals associated with the two channels maybe denoted by $S1=I1+jQ1$ and $S2=I2+jQ2$. These two output signals may be stored in the memory buffer 334. The memory buffer 334 may, for example, be implemented as a cyclic buffer, such as a one or two line memory, or as a larger memory unit. The output signals S1 and S2 may be processed in non-real-time by reading values from the memory buffer 334, operating on these values, and rewriting the values to the memory buffer 334 so that the values may be processed multiple times to extract different properties. Time-reversed processing may be particularly useful to compensate for ghosting, and the use of diversity may permit relatively long ghost delays to be compensated for.

As shown in FIG. 8, the signals S1 and S2 may be filtered by the complex digital filter circuit 338 using both finite impulse response (FIR) filters and infinite impulse response (IIR) filters. The complex video sample data S1 from channel 1 is FIR filtered using a filter matched to channel 1, which is denoted by $C1^\#$ and in the time domain is a time-reversed conjugate filter formed from the coefficients of the z-polynomial C1 that describes the first multipath channel. The complex video sample data S2 from channel 2 is FIR filtered using a filter matched to channel 2, which is denoted by $C2^\#$ and in the time domain is a time-reversed conjugate filter formed from the coefficients of the z-polynomial C2 that describes the second multipath channel. The sum of the signals from the FIR filters is then IIR filtered using an IIR filter having the following transfer function: $1/(C1^\#C1+C2^\#C2)$.

The denominator of the IIR filter transfer function has roots that occur in conjugate-reciprocal pairs. Thus, half of the roots have a magnitude less than one and may be applied through forward time processing. The other half of the roots have magnitudes greater than one, i.e., are non-causal, and may be implemented using an IIR filter that is formed from the reciprocal roots applied to the video sample data taken in time-reversed order. The IIR filters have, in principle, infinite memory, but these filters may be used to process one line of video samples at a time as follows:

(i) initialize the time-reverse IIR filter memory by jamming in the expected sync pulse waveform, which is known a-priori;

(ii) run the IIR filter initialized in (i) over the video samples taken in time-reversed order, starting with the sample immediately preceding the sync pulse. Continue processing through all samples of the preceding sync pulse;

(iii) initialize the forward-time IIR filter memory by jamming in the expected sync pulse waveform of the preceding sync pulse known a-priori and as many already-processed video samples from the preceding line as may be desired;

(iv) run the IIR filter initialized in (iii) from the first video sample after the sync pulse referred to in (ii) and continue processing through to the end of the next sync pulse.

After the above four operations, the "preceding sync pulse" mentioned in (ii) and (iii) will have been processed in both forward and reverse time order, and its waveform may be processed for determining other features.

To implement the IIR filters, the roots of the polynomial $C1^\#C1+C2^\#C2$ are calculated. The roots may also recalculated whenever C1 or C2 changes. The process of updating the estimates of C1 and C2 and recalculating the roots may be simplified by avoiding an entire recalculation and instead performing a root update procedure to take into account small changes in C1 and C2. A method of determining complex roots of polynomials with complex coefficients is described in U.S. patent application Ser. No. 09/915,896, filed Jul. 26, 2001, the disclosure of which is hereby incorporated herein by reference. The method is based on determining the complex amount by which root(i) is in error, given current approximations for the roots from Equation 2 below:

$$\frac{P(\text{root}(i))}{\prod_{k \ne i} [\text{root}(k) - \text{root}(i)]} \qquad \text{EQ. 2}$$

where P is the polynomial to be factorized. When the roots are to be found for the first time given a new set of coefficients for polynomial P, this Equation 2 is computed iteratively starting with initial values for the roots and then incrementing the index i from 1 through 2N, where N is the maximum multipath channel delay in video sample periods.

If the coefficients change to a completely different set, then the iterative process of root finding begins anew. If, however, the coefficients change slightly, as when channel estimates are updated from previous values to new values based on more received signal samples, the iterative process need not necessarily begin anew. Rather, with the assumption that the new roots for the updated polynomial will only have moved slightly from the old root positions, a single iteration of the above formula may suffice to update the roots. It may, therefore, be possible to perform root tracking as well as channel tracking using Equation 2. In television receivers, when a new line of video samples is received, the operations described above may be performed to equalize one or more lines of video signal data to update the channel coefficients from a set C1, C2 to a new set C1+dC1, C2+dC2. The new coefficients are used to reform the polynomial P, which will in turn have its coefficient set updated to the set P+dP. Calculating Equation 2 one time for each value of i using the updated coefficients P+dP determines the error in the roots, i.e., the amount by which a root has to be changed to refine its value so that it is a root of the updated polynomial coefficients. Because the roots of P occur in conjugate reciprocal pairs, Equation 2 need only be calculated N times, each time updating a root and its conjugate reciprocal partner. For ghost delays equal to a significant fraction (e.g., 30%) of a line period (e.g., 273 samples), a relatively fast processor may be needed. The frequency of the root update operations is linked to the speed at which multipath coefficients change. Thus, root update operations need not be performed every line scan period. It may be sufficient to perform root update operations once per frame period or less for static television receivers, while once per ten line scan periods may be sufficient for mobile television reception. One compromise is to execute Equation 2 to update only one root per line scan period, such that all of the possible 273 root pairs are updated each frame period.

Separate from the root tracking operations described above, the FIR and IIR filters may be implemented with a length of 273 and operate at the video sample rate, which may be processing intensive. Such filters, however, may be implemented in hardware with their coefficients programmable in accordance with embodiments of the present invention.

Returning to FIG. 8, The magnitude squared of the sync pulse samples is given by $E^2+F^2$, where $E=S1\ C1^{\#}/(C1^{\#}C1+C2^{\#}C2)$ and $F=S2\ C2^{\#}/(C1^{\#}C1+C2^{\#}C2)$. This magnitude may then be used by the line synchronization circuit 336 to adjust line synchronization. Initially, before any estimate of line sync is available, a search of the processed samples may be made for peak video values indicative of the likely position of sync pulses. Thereafter, the estimate of the sync pulse position in the cyclic buffer memory may be refined by estimating where rising and falling edges lie and adjusting the mean sync pulse position estimate to coincide with the rising and falling edges.

Having determined the sync pulse position, the channel estimation circuit updates the estimates of the channel polynomials C1 and C2 by correlating the unprocessed channel signals S1 and S2 with the expected sync pulse waveform. In accordance with some embodiments of the present invention, the expected sync pulse waveform may include the color subcarrier reference burst. In other embodiments, instead of correlating a channel signal with a sync pulse waveform, a filtered channel waveform may be correlated with a similarly filtered sync pulse waveform, using a filter, such as a differentiator, to enhance edges, thereby giving improved time resolution accuracy. More specifically, the filter may have the effect of making the spectrum of the filtered sync pulse waveform as close to white as possible. Such a filter may be precomputed along with the filtered sync pulse waveform used for correlation.

The processed, diversity combined sync pulse samples may also be used by the phase and frequency error circuit 344 to correct the phase of the video waveform so that the video signal lies in the real plane. The phase angle of the samples lying at the sync pulse peak may be determined and fed to a second order digital phase locked loop that estimates both phase and frequency error from rate of change of phase by conventional techniques. A common phase rotation value is sent to the phase correction units of all channels, which may lie in the real-time signal-processing portion of the diversity homodyne receiver 302 (e.g., first and second phase correction circuits 326 and 332). The phase correction may be computed by applying the frequency error to a modulo $2\pi$ accumulator so that phase corrections are updated continuously between instants when the frequency error is updated.

The homodyne offset, which is now, as discussed above, replaced by an arbitrary constant of integration, is estimated by the homodyne offset estimator circuit 346. The offset may be estimated by correlating the signals S1 and S2 with the half color subcarrier frequency signal, as described above with reference to FIG. 7. The offset values dI1, dQ1, dI2, and dQ2 may then be applied by the adder circuits 304, 306, 308, and 312, respectively, to form a first-order offset nulling loop.

After the operations described above, the real part E of the processed video samples may be used to perform chrominance signal extraction, demodulation, and combination with the luminance signal to form RGB signals.

Analog television transmission conforming to the NTSC, PAL, and/or SECAM standards may be supplemented by digital television broadcasting. Digital video broadcasting may provide higher definition (e.g., HDTV) and better quality. The use of equalizers to decode digital signals in the presence of multipath propagation distortion is generally more widely understood and practiced than analog television ghost compensation described above. The principles and concepts described herein, however, may be used as equalization techniques for digital television signals. Moreover, diversity reception may also be beneficial in reducing errors in digital signals. For example, the diversity homodyne receiver of FIG. 8 may be used for digital television reception by modifying the line synchronization circuit to operate as a digital decoder for decoding binary data from the signal using, for example, error correction decoding. The analogous function to line synchronization may be acquiring frame synchronization with the digital signal by detecting the presence of a known symbol pattern in the digital stream.

A known symbol pattern inserted periodically at the transmitter may also be used for channel estimation in place of using the sync pulse for channel estimation in an analog television environment. Such known symbol patterns may be called sync words in the art of digital signal equalization as practiced in digital cellular telephone systems, for example. Thus, the block diagrams of FIGS. 4, 7, and 8 may be used for digital and analog television reception by incorporating digital process algorithms along with analog processing algorithms in the same hardware units or chips.

Embodiments of television receivers have been described herein that may operate based on homodyne reception and digital signal processing and may be implemented using a single radio frequency chip and a single digital signal-processing chip. Moreover, these receiver embodiments may be readily designed to decode analog television standard signals and digital or high definition television standard signals by incorporating appropriate modes within the digital chip and controlling it to decode a selected standard. Thus, a multi-mode analog/digital or multi-standard television receiver may be constructed using substantially the same components for each mode or standard. Embodiments of television receivers, in accordance with the present invention, may also accommodate diversity reception and reduce ghosting. Diversity equalization techniques described above may also be used to improve picture stability during mobile reception.

In concluding the detailed description, it should be noted that many variations and modifications can be made to the preferred embodiments without substantially departing from the principles of the present invention. All such variations and modifications are intended to be included herein within the scope of the present invention, as set forth in the following claims.

I claim:

1. A multi-mode television picture receiving apparatus, comprising:
    a radio frequency (RF) circuit that is configured to generate a complex baseband signal responsive to a television picture signal received from a television transmitter;
    an analog-to-digital (A/D) converter that generates digital samples responsive to the complex baseband signal; and
    a digital signal processing (DSP) circuit that is configured to generate decoded color video signals responsive to the digital samples, the DSP circuit being switchable between a first decoding mode for an analog television standard and a second decoding mode for a digital television standard.

2. The apparatus of claim 1, wherein the RF circuit is a direct conversion (homodyne) receiver circuit.

3. The apparatus of claim 1, wherein the DSP circuit is configured to remove a homodyne direct current (DC) offset from the digital samples.

4. The apparatus of claim 1, wherein the RF circuit comprises two receiver channels for receiving the television picture signal from two different antennas and is further configured to generate a first complex baseband signal responsive to the television picture signal received through a first one of the antennas and to generate a second complex baseband signal responsive to the television picture signal received through a second one of the antennas, wherein the A/D converter is further configured to generate first digital samples responsive to the first complex baseband signal and second digital samples responsive to the second complex baseband signal, and wherein the DSP circuit is further configured to combine the first and the second digital samples to generate the decoded color video signals.

5. The apparatus of claim 4, wherein the DSP circuit is further configured to filter the first and the second digital samples to reduce ghosting in the decoded color video signals.

6. The apparatus of claim 4, wherein the DSP circuit comprises an equalizer circuit that is configured to process the first and the second digital samples to reduce ghosting in the decoded color video signals.

7. A television picture receiving apparatus, comprising:
    a direct conversion radio frequency (RF) circuit that comprises a quadrature converter circuit, the quadrature converter circuit being configured to generate a complex baseband signal responsive to a television picture signal received from a television transmitter;
    an offset canceller circuit that is configured to attenuate a direct current (DC) offset in the complex baseband signal;
    an analog-to-digital (A/D) converter that is configured to generate numerical samples responsive to the complex baseband signal; and
    a digital signal processing (DSP) circuit that is configured to generate decoded color video signals responsive to the numerical samples.

8. The apparatus of claim 7, wherein the DSP circuit is switchable between a first decoding mode for a first television standard and a second decoding mode for a second television standard.

9. The apparatus of claim 8, wherein the first television standard is an analog transmission standard and the second television standard is a digital television transmission standard.

10. The apparatus of claim 9, wherein the analog transmission standard is NTSC.

11. The apparatus of claim 9, wherein the digital television transmission standard uses 8-level vestigial sideband amplitude modulation.

12. The apparatus of claim 7, wherein the direction conversion RF circuit comprises two receiver channels for receiving the television picture signal from two different antennas, wherein the quadrature convertor circuit is further configured to generate a first complex baseband signal responsive to the television picture signal received through a first one of the antennas and to generate a second complex baseband signal responsive to the television picture signal received through a second one of the antennas, wherein the A/D converter is further configured to generate first numerical samples responsive to the first complex baseband signal and second numerical samples responsive to the second complex baseband signal, and wherein the DSP circuit is further configured to combine the first and the second numerical samples to generate the decoded color video signals.

13. The apparatus of claim 12, wherein the DSP circuit comprises an equalizer circuit that is configured to process the first and the second numerical samples to reduce ghosting in the decoded color video signals.

14. The apparatus of claim 13, wherein the equalizer circuit comprises:
    a memory having ones of the first and the second numerical samples associated with at least one horizontal line scan period stored therein; and
    wherein the equalizer circuit is configured to process the ones of the first and the second numerical samples in time-reversed order.

15. The apparatus of claim 7, wherein the television picture signal comprises a video carrier frequency signal and a color subcarrier frequency signal, and wherein the quadrature convertor circuit comprises a local oscillator that generates an output signal at a frequency that is displaced from the video carrier frequency by half of the color subcarrier frequency.

16. The television picture receiving apparatus of claim 7, wherein the direct conversion radio frequency (RF) circuit comprises:
a first downconvertor circuit that generates a first complex baseband signal responsive to a first television signal received on a first channel, the first television signal comprising a first known information field;
a second downconvertor circuit that generates a second complex baseband signal responsive to a second television signal received on a second channel, the second information signal comprising a second known information field; and wherein the television picture receiving apparatus further comprises:
a memory that has samples of the first and second complex baseband signals stored therein; and
a filter circuit that filters the stored samples of first and second complex baseband signals in forward and reverse time order.

17. The television receiver of claim 16, wherein the filter circuit comprises:
a first finite impulse response (FIR) filter that has a transfer function matched to the first channel and generates a first output signal responsive to the stored samples of the first complex baseband signal;
a second finite impulse response (FIR) filter that has a transfer function matched to the second channel and generates a second output signal responsive to the stored samples of the second complex baseband signal; and
an infinite impulse response (IIR) filter that has a transfer function given by $1/(C1^{\#}C1+C2^{\#}C2)$, where C1 corresponds to the coefficients of a z-polynomial describing the first channel, $C1^{\#}$ corresponds to the coefficients of the first FIR filter, C2 corresponds to the coefficients of a z-polynomial describing the second channel, and $C2^{\#}$ corresponds to the coefficients of the second FIR filter, and generates a third output signal that is responsive to a sum of the first and second output signals of the first and second FIR filters, respectively.

18. The television receiver of claim 16, further comprising:
a synchronization circuit that determines positions of the first and second known information fields responsive to the filtered stored samples.

19. The television receiver of claim 16, further comprising:
a channel estimation circuit that estimates transfer functions of the first and second channels responsive to the filtered stored samples by correlating the first and second complex baseband signals with the first and second known information fields, the filter circuit being responsive to the estimated transfer functions of the first and second channels.

20. A method of operating a television receiver, comprising: receiving a television signal;
downconverting the television signal to generate a complex baseband signal;
differentiating the complex baseband signal;
sampling the differentiated complex baseband signals to generate digital samples thereof and integrating the digital samples to generate an integrated output signal.

21. The method of claim 20, wherein downconverting the television signal to generate the complex baseband signal comprises:
multiplying the television signal by a local oscillator signal having a frequency that is different from a carrier frequency of the television signal.

22. The method of claim 21, wherein the television signal comprises a color subcarrier frequency and the local oscillator signal is equal to the a carrier frequency of the television signal plus half of the color subcarrier frequency.

23. The method of claim 22, further comprising:
rotating the integrated output signal in the complex domain to remove a frequency offset corresponding to half of the color subcarrier frequency.

24. The method of claim 20, wherein the television signal comprises a periodic known information field, the method further comprising:
adjusting a phase of the integrated output signal so that the known information field is on the real axis.

25. The method of claim 20, wherein the television signal comprises a periodic known information field, the method further comprising:
correlating the integrated output signal with the known information field to determine a residual offset therein associated with a constant used in integrating the differentiated complex baseband signal; and
subtracting the residual offset from the constant used in integrating the differentiated complex baseband signal.

26. The method of claim 20, wherein receiving the television signal comprises:
receiving a first television signal on a first channel, the first television signal comprising a first known information field;
receiving a second television signal on a second channel, the second television signal comprising a second known information field, and wherein downconverting the television signal comprises:
downconverting the first television signal to generate a first complex baseband signal;
downconverting the second television signal to generate a second complex baseband signal;
storing samples of the first and second complex baseband signals in a memory; and
filtering the stored samples of the first and second complex baseband signals by processing the stored samples in forward and reverse time order.

27. The method of claim 26, wherein filtering the stored samples comprises:
filtering the stored samples of the first complex baseband signal using a first finite impulse response (FIR) filter having a transfer function matched to the first channel; and
filtering the stored samples of the second complex baseband signal using a second finite impulse response (FIR) filter having a transfer function matched to the second channel.

28. The method of claim 27, wherein filtering the stored samples further comprises:
summing outputs of the first and second FIR filters;
filtering the summed outputs of the first and second FIR filters using an infinite impulse response (IIR) filter having a transfer function given by $1/(C1^{\#}C1+C2^{\#}C2)$, where C1 corresponds to the coefficients of a z-polynomial describing the first channel, $C1^{\#}$ corresponds to the coefficients of the first FIR filter, C2 corresponds to the coefficients of a z-polynomial describing the second channel, and $C2^{\#}$ corresponds to the coefficients of the second FIR filter.

29. The method of claim 26, further comprising:
determining positions of the first and second known information fields based on the filtered stored samples.

30. The method of claim 26, further comprising:
estimating transfer functions of the first and second channels based on the filtered stored samples by correlating the first and second complex baseband signals with the first and second known information fields.

31. The method of claim 26, further comprising:
differentiating the first and second complex baseband signals; and
integrating the differentiated complex baseband signals.

32. A television receiver, comprising:
a downconvertor circuit that generates a complex baseband signal responsive to a television signal;
a differentiator circuit that generates a differentiated complex baseband signal responsive to the complex baseband signal;
an integrator circuit that generates an integrated output signal responsive to the differentiated complex base band; and
a rotation circuit that rotates the integrated output signal in the complex domain to adjust a frequency offset in the integrated Output signal.

33. The television receiver of claim 32, wherein the integrator circuit comprises an adder circuit and an accumulator circuit connected in sense.

34. The television receiver of claim 33, further comprising an analog-to-digital (A/D) convertor that couples the differentiator circuit to the adder circuit.

35. The television receiver of claim 33, further comprising:
a processor circuit that is configured to correlate the integrated output signal with a known information field to determine a residual offset therein, the adder circuit being responsive to the residual offset.

* * * * *

UNITED STATES PATENT AND TRADEMARK OFFICE
CERTIFICATE OF CORRECTION

| | | |
|---|---|---|
| PATENT NO. | : 7,038,733 B2 | Page 1 of 1 |
| APPLICATION NO. | : 10/060803 | |
| DATED | : May 2, 2006 | |
| INVENTOR(S) | : Dent | |

It is certified that error appears in the above-identified patent and that said Letters Patent is hereby corrected as shown below:

Column 18,
Line 12 should read -- lator signal is equal to a carrier frequency of the --

Column 20,
Line 9 should read -- mulator circuit connected in series. --

Signed and Sealed this

Nineteenth Day of September, 2006

JON W. DUDAS
*Director of the United States Patent and Trademark Office*